US012487252B2

(12) United States Patent
Haga

(10) Patent No.: US 12,487,252 B2
(45) Date of Patent: Dec. 2, 2025

(54) PROBE AND PROBE DEVICE

(71) Applicant: Hirose Electric Co., Ltd., Kanagawa (JP)

(72) Inventor: Yujin Haga, Kanagawa (JP)

(73) Assignee: HIROSE ELECTRIC CO., LTD., Kanagawa (JP)

( * ) Notice: Subject to any disclaimer, the term of this patent is extended or adjusted under 35 U.S.C. 154(b) by 137 days.

(21) Appl. No.: 18/488,450

(22) Filed: Dec. 8, 2023

(65) Prior Publication Data

US 2024/0125814 A1 Apr. 18, 2024

(51) Int. Cl.
*G01R 1/067* (2006.01)
*G01R 31/28* (2006.01)

(52) U.S. Cl.
CPC ......... *G01R 1/067* (2013.01); *G01R 31/2801* (2013.01)

(58) Field of Classification Search
CPC ........ G01R 1/067; G01R 1/04; G01R 1/0408; G01R 31/2808; G01R 1/07307; G01R 1/07342; G01R 1/06788; G01R 1/06705; G01R 31/2884
USPC ............ 324/754.11, 754.12, 754.14, 755.01, 324/756.01
See application file for complete search history.

(56) References Cited

U.S. PATENT DOCUMENTS 6,062,915 A * 5/2000 Costello ................. H01R 11/24 439/729
6,575,762 B2 * 6/2003 Evans .................. H05K 1/0219 439/63
2009/0153160 A1 * 6/2009 Huang .................. G11C 29/56 324/763.01

FOREIGN PATENT DOCUMENTS

JP 2018-081745 A 5/2018

* cited by examiner

*Primary Examiner* — Roberto Velez
(74) *Attorney, Agent, or Firm* — Procopio, Cory, Hargreaves & Savitch LLP

(57) ABSTRACT

[Problem]
To provide a probe and a probe device that can be easily attached to and detached from circuit boards and make it possible to conduct testing of circuit boards or electronic components in an efficient manner.
[Means of Solution]
A first clamping piece 20 has first clamping portions 25 at one end located adjacent to the circuit board P that make contact with one surface of a circuit board P; a second clamping piece 30 has a second clamping portion 31 at one end located adjacent to the circuit board P that makes contact with the other surface of the circuit board; the first clamping piece 20 and second clamping piece 30 have operative portions 26, 32 at the other end located on the side distal from the circuit board P for receiving an operating force opposing a biasing force exerted by a biasing member 40.

10 Claims, 10 Drawing Sheets

PROBE AND PROBE DEVICE

CROSS-REFERENCE TO RELATED APPLICATIONS

This application claims priority to Japanese Patent Application No. 2022-0166709, filed Oct. 18, 2022, the contents of which are incorporated herein by reference in its entirety for all purposes.

BACKGROUND

Technical Field

The present invention relates to a probe connected to a circuit board and to a probe device having said probe.

Background Art

Usually, when testing for electrical characteristics is conducted on circuit boards or electronic components mounted on circuit boards, the electrical characteristics obtained after transmitting test signals to the circuit boards are measured by measuring equipment. At this time, the measuring equipment is connected to the circuit boards via cables and the like.

A coaxial electrical connector connected to an end of a circuit board has been disclosed in Patent Document 1. This coaxial electrical connector has a center conductor, which has an axis parallel to the surface of the circuit board and which extends in the axial direction, and a tubular outer conductor, which retains the center conductor, with an insulator disposed therebetween. A pair of fixtures used for attachment to the circuit board are provided extending parallel to the surface of the circuit board in the outer conductor. Receiving through-holes, i.e., screw holes, are formed in each fixture extending therethrough in a vertical direction (in a direction perpendicular to the surface of the circuit board). This coaxial electrical connector is attached to an end of the circuit board by securing the fixtures to said end with screws. Specifically, once the fixtures are placed on the top face of the end of the circuit board and the receiving through-holes are positionally aligned with aperture portions formed in the circuit board, screws are threaded into the receiving through-holes and aperture portions.

PATENT DOCUMENTS

[Patent Document 1]

Japanese Published Patent Application No. 2018-081745.

SUMMARY

Problems to be Solved

In order to conduct testing of numerous circuit boards or electronic components, the operation of connecting a circuit board to the measuring equipment usually needs to be repeated successively for every circuit board. Consequently, if the coaxial electrical connector of Patent Document 1 is used for testing circuit boards or electronic components, the operations of attachment and detachment of the coaxial electrical connector to and from a circuit board, that is, the operations of fastening and unfastening of screws, must be performed in succession. As a result, the operations of attachment and detachment become cumbersome and it becomes difficult to perform testing of multiple circuit boards or electronic components efficiently over a short period of time.

With such considerations in mind, it is an object of the present invention to provide a probe and a probe device that can be easily attached to and detached from circuit boards and make it possible to conduct testing of circuit boards or electronic components in an efficient manner.

Technical Solution (1) The inventive probe, which is provided in a probe device interconnecting measuring equipment used for measuring the electrical characteristics of a circuit board or the electrical characteristics of electronic components mounted on the circuit board and said circuit board via a cable, is attached to an end of the cable and connected to the circuit board.

Such a probe, in the present invention, is a probe having a signal conductor electrically communicable with signal circuitry formed on the surface of one side of a circuit board, a board clamping body capable of clamping the circuit board in its through-thickness direction, and a biasing member maintaining the board clamping body in a state of clamping the circuit board, wherein the board clamping body has a first clamping piece located on one side with respect to the circuit board and retaining the signal conductor, and a second clamping piece located on the other side with respect to the circuit board; the biasing member is provided spanning between the first clamping piece and second clamping piece in a resiliently deformable manner and biases the first clamping piece and second clamping piece toward a position clamping the circuit board; the first clamping piece has first clamping portions at one end located adjacent to the circuit board that are placed in contact with one surface of the circuit board, and the second clamping piece has a second clamping portion at one end located adjacent to the circuit board that is placed in contact with the other surface of the circuit board; and at least one of the first clamping piece and second clamping piece has an operative portion at the other end located on the side distal from the circuit board for receiving an operating force that opposes a biasing force exerted by the biasing member.

In the present invention, when attaching the probe to a circuit board, first, the first clamping portions and second clamping portion are spread widely apart by applying an operating force that opposes the biasing force of the biasing member to the operative portions of the probe, and, while maintaining this condition, the probe is disposed such that the circuit board is positioned between the first clamping portions and second clamping portion. Here, the first clamping portions are located on one side with respect to the circuit board, and the second clamping portion is located on the other side with respect to the circuit board. Next, the circuit board is clamped by removing the above-mentioned operating force and allowing the first clamping portions and second clamping portion to be brought into closer proximity by the biasing force of the biasing member. In this manner, the circuit board is clamped by the first clamping portions and second clamping portion subject to the biasing force of the biasing member, thereby enabling the signal conductor retained by the first clamping piece to be maintained in contact with the circuitry of the circuit board. In addition, when disengaging the probe from the circuit board, the circuit board is unclamped by spreading the first clamping portions and second clamping portion widely apart by applying the above-mentioned operating force to the operative portions of the probe.

Thus, in accordance with the present invention, testing of circuit boards or electronic components mounted on circuit boards can be performed in an efficient manner because the probe can be easily attached to and detached from circuit boards by simply applying or removing an operating force to or from the operative portions of the probe.

(2) In the invention of (1), one of the first clamping portions and second clamping portion may be adapted to have protrusions inserted into pass-through spaces formed in the circuit board in the through-thickness direction, and the other clamping portion may be adapted to have a receiving portion for receiving the distal end portions of the protrusions protruding out through the pass-through spaces from the other side of the pass-through spaces.

In the invention of (2), once the circuit board has been clamped by the first clamping portions and second clamping portion of the probe, the above-mentioned protrusions are inserted into the pass-through spaces of the circuit board and, furthermore, the distal end portions protruding from the pass-through spaces enter the above-mentioned receiving portion. Therefore, the above-mentioned protrusions are located within the pass-through spaces and within the receiving portion. Furthermore, since movement of the above-mentioned protrusions in directions parallel to the circuit board is restricted by the edge portions of the pass-through spaces, the position of the probe relative to said circuit board is fixed, and the state of contact between the signal conductor and the signal circuitry of the circuit board is properly maintained.

(3) In the invention of (2), the protrusions may be insertable into pass-through spaces formed by making cut-outs in an edge of the circuit board. Doing so makes it possible for the protrusions of the probe to be inserted and removed through the openings of the pass-through spaces formed in the edge of the circuit board when the probe is attached to and detached from said circuit board. Therefore, the probe can be attached and detached even by moving the probe in an oblique direction inclined with respect to the through-thickness direction of the circuit board, thereby simplifying the operations of attachment and detachment.

(4) In any of the inventions of (1) through (3), the signal conductor may have a dielectric body retained by the first clamping piece, and a center conductor retained by the dielectric body and enabled to make contact with signal circuitry on the circuit board.

(5) In the invention of (4), the first clamping piece, along with being made of metal and being electrically communicable with an outer conductor in the cable, may be enabled to make contact with ground circuitry formed on the surface of one side of the circuit board. As a result, when there is a flow of signal current through the center conductor of the signal conductor and the signal circuitry of the circuit board as the transmission path, a return current can be directed to flow through the ground circuitry, first clamping piece, and outer conductor as the transmission path.

(6) In the inventions of (4) and (5), the first clamping piece may be connectable to the end of the cable by attaching thereto an attachment member provided at the end of the cable.

(7) In the inventions of (4) and (5), the first clamping piece may be connectable to the end of the cable by mating therewith a connector for probe connection provided at the end of the cable.

(8) In any of the inventions of (1) through (3), the signal conductor may have a plate-shaped substrate made of an electrically insulating material, and a metallic signal transmission path provided on the substrate along a major face of the substrate and enabled to make contact with signal circuitry on the circuit board.

(9) In the invention of (8), the signal conductor may have a metallic ground transmission path provided on the substrate along a major face of the substrate, and the ground transmission path may be enabled to make contact with ground circuitry formed on the surface of one side of the circuit board. Since the ground transmission path of the signal conductor is enabled to make contact with the ground circuitry on the surface of one side of the circuit board, when there is a flow of signal current through the signal transmission path of the signal conductor and the signal circuitry of the circuit board as the transmission path, a return current can be directed to flow through the ground circuitry and the ground transmission path as the transmission path.

(10) The inventive probe device is characterized by having the probe of any of (1) through (9), a connector for connecting measuring equipment connected to a counterpart connector provided as part of the measuring equipment, and a cable interconnecting the probe and the connector for connecting measuring equipment.

Technical Effects

The present invention can provide a probe and a probe device that can be easily attached to and detached from a circuit board and make it possible to perform testing of circuit boards or electronic components in an efficient manner.

DETAILED DESCRIPTION

Embodiments of the present invention will be described hereinbelow with reference to the accompanying drawings.

First Embodiment

Figure 1:
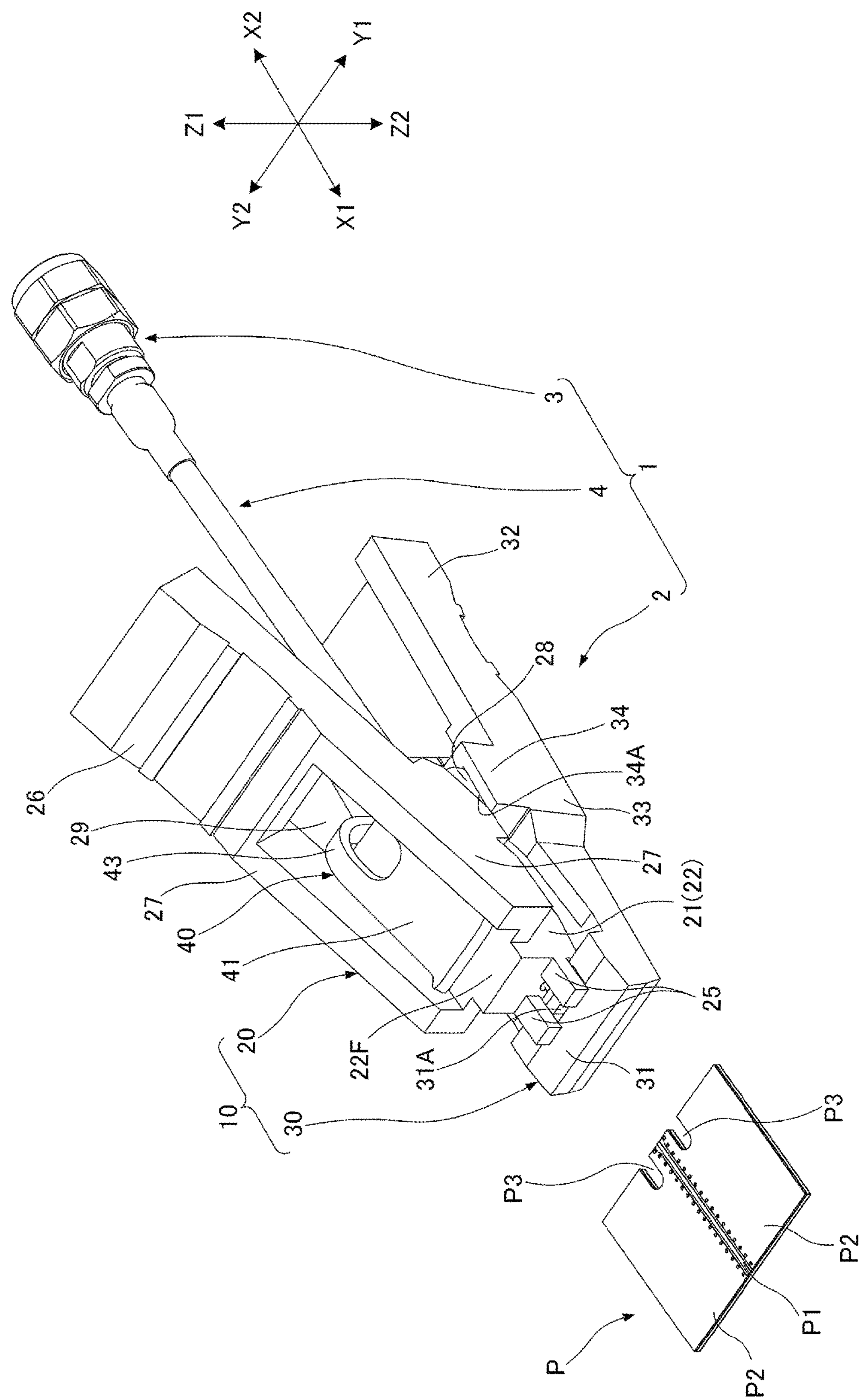
FIG. 1 is a perspective view illustrating the probe device of the first embodiment of the present invention along with a circuit board, showing a state before attachment to the circuit board.

FIG. 1 is a perspective view illustrating the probe device 1 of the first embodiment of the present invention along with a circuit board P. The circuit board P, which is illustrated only partially, is actually formed to extend farther both in the X-axis direction and in the Y-axis direction. In the present embodiment, the X-axis direction is the “forward-backward direction,” with the X1 direction corresponding to “forward” and the X2 direction corresponding to “rearward.” In addition, the Y-axis direction is the “probe width direction.” The circuit board P is a so-called test board used for performance testing of electronic components such as IC chips (not shown).

As is shown in FIG. 1, a signal pattern P1 serving as signal circuitry, which extends in the forward-backward direction (X-axis direction) on the mounting face, and a ground pattern P2 serving as ground circuitry, which extends around the signal pattern P1, are formed on the mounting face of the circuit board P (top face in FIG. 1). Electronic components subject to performance testing (not shown) are mounted in the vicinity of the front end portion (the end on the X1 side) of the signal pattern P1, and the probe device 1 is connected in the vicinity of the rear end portion (the end on the X2 side) of the signal pattern P1 (test port) (see FIG. 6). In addition, notched portions P3 serving as pass-through spaces are formed as cutouts in the rear edge of the circuit board P extending in the probe width direction (Y-axis direction), on the opposite sides of the signal pattern P1 in the probe width direction. The notched portions P3, along with being disposed through the circuit board P in the through-thickness direction, i.e., in the vertical direction (Z-axis direction), are rearwardly (in the X2 direction) open, and serve as positioning portions used for fixing the position of the hereinafter-described probe 2.

As shown in FIG. 1, the probe device 1 has a probe 2, which is connected to the circuit board P, a connector for connecting measuring equipment 3, which is connected to a counterpart connector (not shown) provided as part of the measurement equipment (not shown) used to measure the electrical characteristics of the electronic components, and a coaxial cable 4 (referred to as “cable 4” hereinbelow), which extends in the forward-backward direction (X-axis direction) and interconnects the probe 2 and the connector for connecting measuring equipment 3. It should be noted that the counterpart connector may be provided in the measuring equipment itself, or alternatively, in other equipment connected to the measuring equipment.

The probe 2 is a clip-type probe provided in the front end portion of the cable 4. The probe 2 has a metallic board clamping body 10, which is capable of clamping the circuit board P in the vertical direction (Z-axis direction), i.e., in the through-thickness direction thereof, a metallic biasing member 40, which maintains the board clamping body 10 in a state of clamping the circuit board P, and a signal conductor 50, which is retained by the board clamping body 10 and is electrically communicable with the signal pattern P1 of the circuit board P (see FIG. 4). The board clamping body 10 is enabled for movement between a closed state (see FIG. 1, FIG. 4) and an open state (see FIG. 5).

Figure 2:
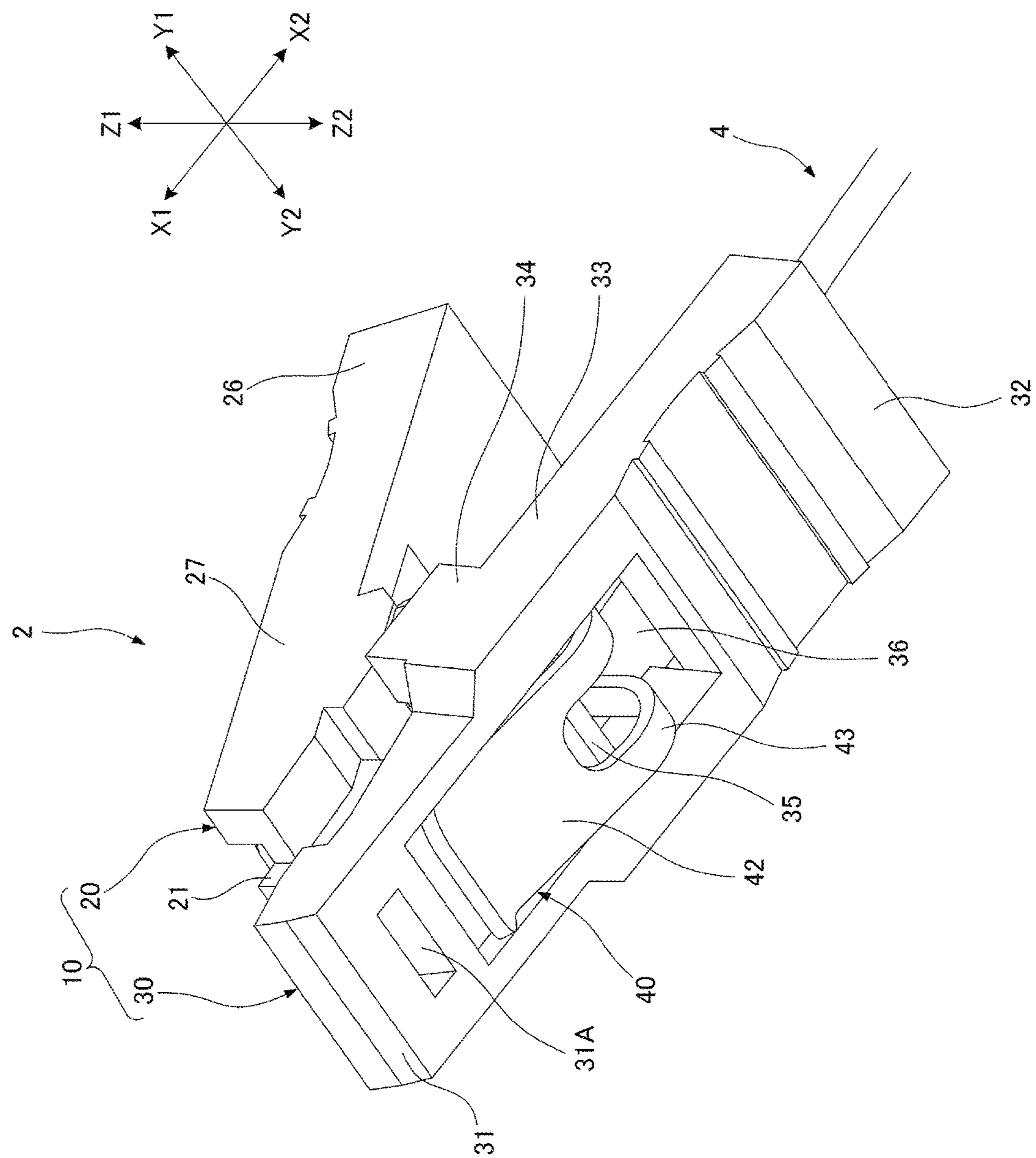
FIG. 2 is a perspective view illustrating the probe of the probe device of FIG. 1 obliquely from below.

FIG. 2 is a perspective view illustrating the probe 2 of the probe device 1 of FIG. 1 obliquely from below. As shown in FIGS. 1 and 2, the board clamping body 10 has a first clamping piece 20, which is located upwardly (on the Z1 side) with respect to the circuit board P and retains the signal conductor 50, and a second clamping piece 30, which is located downwardly (on the Z2 side) with respect to the circuit board P.

Figure 3:
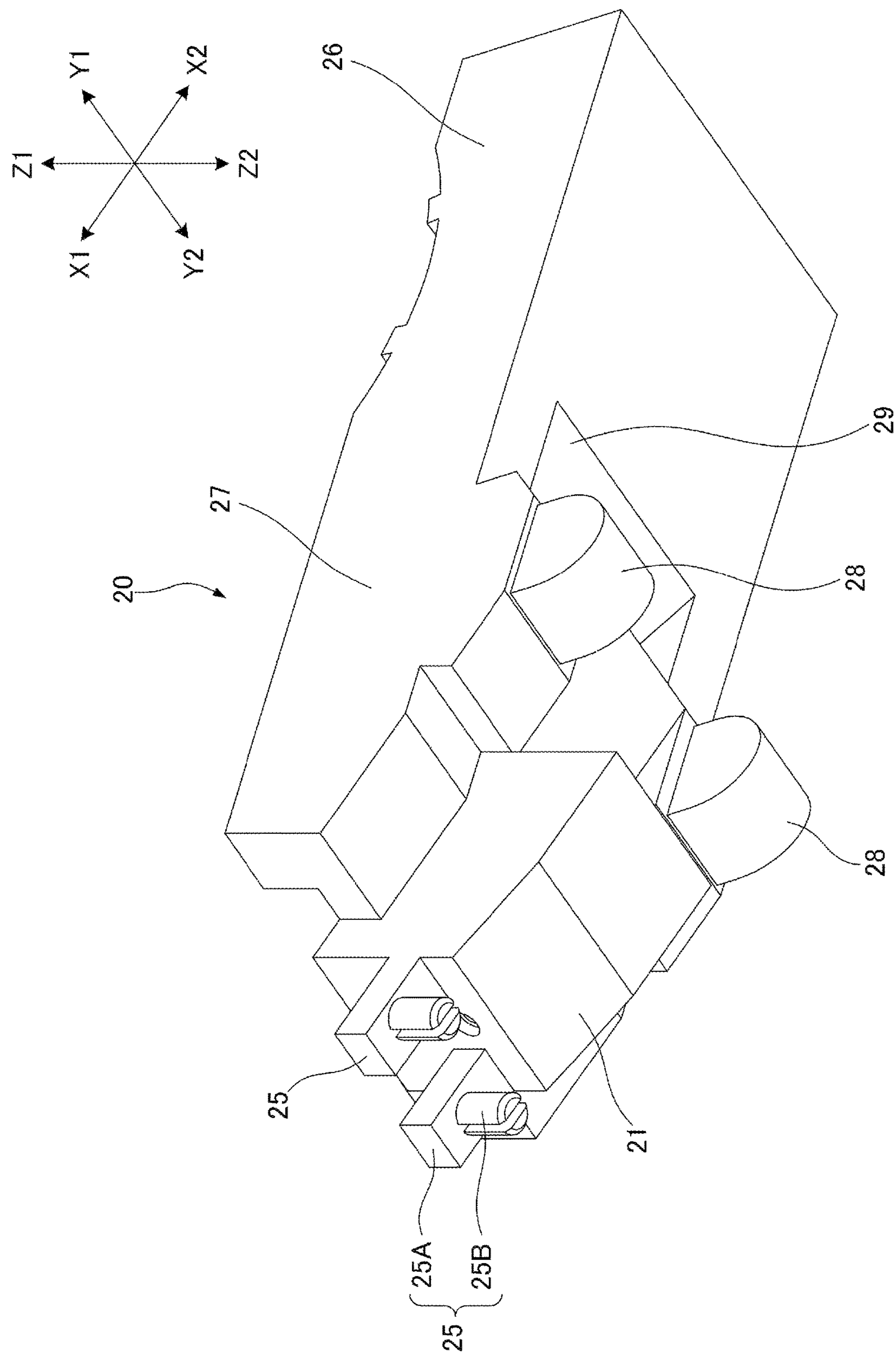
FIG. 3 is a perspective view illustrating the first clamping piece of the probe of FIG. 2 obliquely from below.

FIG. 3 is a perspective view illustrating the first clamping piece 20 obliquely from below. As shown in FIGS. 1 to 3, the first clamping piece 20 is provided extending longitudinally in a direction oriented along the forward-backward direction. The first clamping piece 20 has a base portion 21, which is provided in the front portion, first clamping portions 25, which protrude forwardly from the base portion 21, a first operative portion 26, which is provided in the rear, first coupling portions 27, which couple the base portion 21 and the first operative portion 26, and supported portions 28, which protrude from the bottom faces of the first coupling portions 27.

Figure 4:
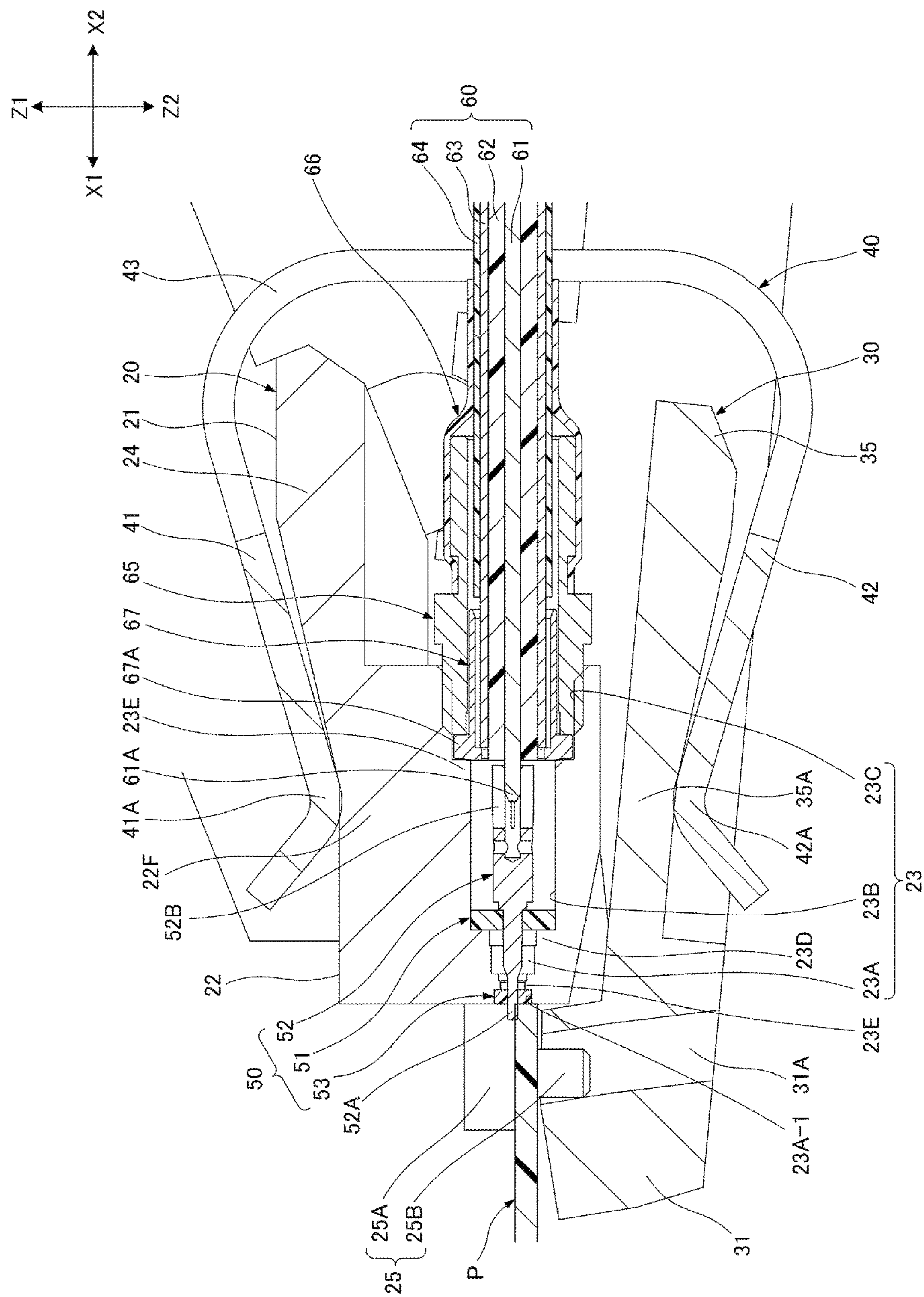
FIG. 4 is a cross-sectional view of the probe of FIG. 2 attached to a circuit board, showing a longitudinal cross-section taken at the middle point in the probe width direction.

FIG. 4 is a cross-sectional view of the probe 2 attached to the circuit board P, showing a longitudinal cross-section taken at the middle point in the probe width direction (Y-axis direction). As shown in FIG. 4, the base portion 21 has a retaining portion 22 for retaining the signal conductor 50 and the front end portion of the cable 4, and a plate-shaped first plate portion 24, which extends rearwardly from the rear end of the top portion of the retaining portion 22.

A circular bore-shaped accommodating aperture portion 23 for accommodating the signal conductor 50 and the front end portion of the cable 4 is formed extending in the forward-backward direction in the bottom portion of the retaining portion 22, in the central area in the probe width direction. As shown in FIG. 4, the accommodating aperture portion 23 has a front aperture portion 23A, an intermediate aperture portion 23B, and a rear aperture portion 23C, which are in successive communication starting from the front. The front aperture portion 23A has stepped portions formed in the inner peripheral surface thereof at a number of locations in the forward-backward direction, with these stepped portions forming a number of spaces of different inside diameter dimensions. Among these multiple spaces, the front end aperture portion 23A-1, which is located forwardmost, is adapted to accommodate and retain the hereinafter-described second dielectric body 53. As shown in FIG. 4, a front-end stepped portion 23E is formed at the location of the boundary between the front end aperture portion 23A-1 and the space adjacent thereto, i.e., the space of a smaller diameter than said front end aperture portion 23A-1 in the rear of the front end aperture portion 23A-1.

The intermediate aperture portion 23B has a larger diameter than the front aperture portion 23A, and a front stepped portion 23D is formed at the location of the boundary between the intermediate aperture portion 23B and the front aperture portion 23A. The rear aperture portion 23C has a larger diameter than the intermediate aperture portion 23B, and a rear stepped portion 23E is formed at the location of the boundary between the rear aperture portion 23C and the intermediate aperture portion 23B. A thread groove for attaching the hereinafter-described fastening fitting 65 provided in the front end portion of the cable 4 (not shown) is formed in the inner peripheral surface of the rear aperture portion 23C. The top portion of the retaining portion 22 constitutes a first pressure-receiving portion 22F receiving a biasing force from the biasing member 40 from above. The top face of the first pressure-receiving portion 22F, which receives the above-mentioned biasing force, is a flat face perpendicular to the vertical direction.

As shown in FIG. 4, the first plate portion 24 is provided at a location offset slightly upwardly of the first pressure-receiving portion 22F. In addition, the top face of the base portion 21 has an inclined face inclined upwardly as one moves rearward from the first pressure-receiving portion 22F to the first plate portion 24 in the forward-backward direction.

The first clamping portions 25 are provided protruding from the front face of the retaining portion 22 at the opposite ends of the bottom portion of the retaining portion 22 in the probe width direction. Namely, when the probe 2 is viewed from the front, the two first clamping portions 25 are located at substantially the same height as the accommodating aperture portion 23 in the vertical direction, sandwiching the accommodating aperture portion 23 in the probe width direction. The first clamping portions 25 have forward tongues 25A of a generally quadrangular prismatic shape protruding forwardly from the front face of the retaining portion 22, and protrusions 25B of a substantially circular columnar configuration protruding downwardly from the bottom faces of the forward tongues 25A (see FIG. 3). The outside diameter of the protrusions 25B is slightly larger than the width dimensions (dimensions in the probe width direction) of the notched portions P3 of the circuit board P. As shown in FIG. 3, the protrusions 25B are split into two projecting pieces by slits formed at the middle point in the probe width direction. These projecting pieces are slightly resiliently deformable in the probe width direction.

As shown in FIG. 1, the first operative portion 26, which is formed in a substantially quadrangular plate-like configuration coupled to the rear ends of the two first coupling portions 27, is adapted to receive a pressure force (operating force) from above during operation of the board clamping body 10. The first coupling portions 27, which are coupled to the respective lateral faces of the base portion 21 in the probe width direction (Y-axis direction), extend at an upward incline as one moves rearward. The space enclosed by the first operative portion 26 and the two first coupling portions 27 is formed as a first accommodating portion 29 that accommodates the hereinafter-described first biasing piece 41 of the biasing member 40. Substantially the front half of the first accommodating portion 29 is sealed from below by the first plate portion 24 and the first pressure-receiving portion 22F located between the two first coupling portions 27. The supported portions 28 are provided protruding downwardly from the bottom faces of the intermediate portions of the first coupling portions 27 in the forward-backward direction. As shown in FIG. 3, the supported portions 28 have a substantially semicircular configuration when viewed in the probe width direction, and their downwardly protruding curved outer peripheral surfaces are supported by the hereinafter-described supporting portions 34 of the second clamping piece 30 to permit pivoting about an axis extending in the probe width direction.

As shown in FIG. 1, FIG. 2, and FIG. 4, the second clamping piece 30, which has a substantially quadrangular plate-like configuration extending longitudinally in the forward-backward direction, has a second clamping portion 31 provided in front, a second operative portion 32 provided in the rear, second coupling portions 33 coupling the second clamping portion 31 and the second operative portion 32, supporting portions 34 protruding from the top faces of the second coupling portions 33, and a plate-shaped second plate portion 35 extending rearwardly from the second clamping portion 31.

The second clamping portion 31 is located forwardly of the base portion 21 of the first clamping piece 20 and downwardly of the first clamping portions 25 of the first clamping piece 20. The second clamping portion 31 is formed larger than the base portion 21 in the probe width direction, and, in addition, larger than the first clamping portions 25 in the forward-backward direction, with the front end of the second clamping portion 31 located forwardly of the front ends of the first clamping portions 25. A receiving portion 31A extending through the second clamping portion 31 in the vertical direction is formed in the rear portion of the second clamping portion 31. When viewed in the vertical direction, the receiving portion 31A is formed in a quadrangular aperture-like configuration of a quadrangular shape whose longitudinal direction is the probe width direction, and, as described below, is adapted to be capable of receiving the protrusions 25B of the two first clamping portions 25 from above when the board clamping body 10 is in the closed position (see FIG. 4).

The second operative portion 32 is formed in a substantially quadrangular plate-like configuration coupled to the rear ends of the two second coupling portions 33, with its shape being a vertical inversion of that of the first operative portion 26 of the first clamping piece 20. The second operative portion 32 is adapted to receive a pressure force (operating force) from below during operation of the board clamping body 10. The second coupling portions 33, which extend in the forward-backward direction, couple the rear end of the second clamping portion 31 and the front end of the second operative portion 32. As shown in FIG. 2, the space enclosed by the second clamping portion 31, second operative portion 32, and two second coupling portions 33 is formed as a second accommodating portion 36 that accommodates the hereinafter-described second biasing piece 42 of the biasing member 40.

The supporting portions 34 are provided protruding upwardly from the top faces of the intermediate portions of the second coupling portions 33 in the forward-backward direction. The supporting portions 34 have supporting recessed portions 34A (see FIG. 1) that are formed as recesses in the top faces thereof and accommodate the supported portions 28 of the first clamping piece 20. The interior wall surface of the supporting recessed portions 34A is a curved concave surface that fits the outer peripheral surface of the supported portions 28 and pivotably supports the supported portions 28. The second plate portion 35, which is provided between the two second coupling portions 33, seals substantially the front half of the second accommodating portion 36 from above. As shown in FIG. 4, the front portion of the second plate portion 35 constitutes a second pressure-receiving portion 35A receiving a biasing force from the biasing member 40 from below. The bottom face of the second plate portion 35 has an inclined face inclined downwardly as one moves rearward.

As shown in FIG. 4, the biasing member 40, which is made by bending a metal strip-like piece in a curved shape in the through-thickness direction, has a forwardly open substantially recumbent U-shaped configuration, and is provided spanning between the first clamping piece 20 and second clamping piece 30 in a resiliently deformable manner. The biasing member 40 has a first biasing piece 41 located upwardly, a second biasing piece 42 located downwardly, and two resilient portions 43 coupling the front ends of the first biasing piece 41 and second biasing piece 42.

As shown in FIG. 4, the first biasing piece 41 extends at a downward incline as one moves forward along the top face of the first clamping piece 20 and has its front end portion bent in an oblique direction oriented forwardly and upwardly. The section that protrudes downwardly at the location of the bend in the first biasing piece 41 is formed as a first biasing portion 41A that biases the top face of the first pressure-receiving portion 22F from above. As shown in FIG. 4, the second biasing piece 42 extends at an upward incline as one moves forward along the bottom face of the second clamping piece 30 and has its front end portion bent in an oblique direction oriented forwardly and downwardly. The section that protrudes upwardly at the location of the bend in the second biasing piece 42 is formed as a second biasing portion 42A that biases the bottom face of the second pressure-receiving portion 35A from below.

The resilient portions 43, which are provided at the opposite ends of the biasing member 40 in the probe width direction, are bent in a substantially recumbent C-shaped configuration open in the forward direction, coupling the rear ends of the first biasing portion 41A and second biasing portion 42A. Since in the present embodiment the two resilient portions 43 are located at a spaced interval from each other in the probe width direction, it is possible to insert and dispose the cable 4 between the two resilient portions 43 and attach it to the first clamping piece 20.

Due to resilient deformation of the resilient portions 43 in the through-thickness direction, the first biasing piece 41 and second biasing piece 42 of the biasing member 40 may be displaced in the vertical direction, i.e., toward and away from each other. Once the biasing member 40 is attached to the board clamping body 10, the resilient portions 43 undergo resilient deformation, with the first biasing piece 41 and second biasing piece 42 displaced so as to widen the spacing between them. As a result, when acted upon by the resilient force (restoring force) of the resilient portions 43, the first biasing piece 41 and second biasing piece 42 bias the first pressure-receiving portion 22F and second pressure-receiving portion 35A of the board clamping body 10 using the first biasing portion 41A and second biasing portion 42A, thereby clamping the board clamping body 10 and maintaining the board clamping body 10 in a closed state.

As shown in FIG. 4, the signal conductor 50 is accommodated in the accommodating aperture portion 23 of the first clamping piece 20 and retained by the retaining portion 22. The signal conductor 50 has a first dielectric body 51, which is accommodated and retained within the intermediate aperture portion 23B, a second dielectric body 53, which is accommodated and retained within the front aperture portion 23A, and a center conductor 52, which is accommodated in the front aperture portion 23A and intermediate aperture portion 23B and retained by the first dielectric body 51 and second dielectric body 53. The first dielectric body 51 and second dielectric body 53, which are toric members made of plastic or another electrically insulating material, are provided in an orientation whose axial direction is the forward-backward direction. The first dielectric body 51 is disposed at the location of the rear end of the intermediate aperture portion 23B. In addition, the second dielectric body 53, which has a smaller diameter than the first dielectric body 51, is disposed within the front end aperture portion 23A-1. In the present embodiment, the first clamping piece 20, which has formed therein the accommodating aperture portion 23 that accommodates the first dielectric body 51, second dielectric body 53, and center conductor 52, is made of metal. Therefore, the functionality of the coaxial electrical connector is implemented by the first dielectric body 51, second dielectric body 53, center conductor 52, and first clamping piece 20. At this time, the first clamping piece 20 serves as an outer conductor.

The center conductor 52, which is a metallic terminal extending in the forward-backward direction, has its intermediate portion in the forward-backward direction press-fittingly retained in the first dielectric body 51 while its front end side section is press-fittingly retained in the second dielectric body 53. The front end portion of the center conductor 52, which protrudes outwardly from the front end opening of the front end aperture portion 23A-1, is formed as a pin-shaped front contact portion 52A that is enabled to make contact with the signal pattern P1 of the circuit board P (see FIG. 1) from above. In addition, multiple resilient pieces resiliently deformable in the radial direction of the intermediate aperture portion 23B are formed as rear contact portions 52B capable of making contact with the hereinafter-described center conductor 61 of the cable 4 in the rear end portion of the center conductor.

When the signal conductor 50 is attached to the retaining portion 22, first, the center conductor 52 is inserted into the central aperture portion of the first dielectric body 51 from the rear, and the center conductor 52 is retained by the first dielectric body 51. Next, the first dielectric body 51 is press-fitted into the accommodating aperture portion 23 from the front. At this time, the first dielectric body 51 is press-fitted until abutting the front stepped portion 23D. Further, along with press-fitting the second dielectric body 53 into the front end aperture portion 23A-1 from the front, the front end side section of the center conductor 52 is inserted into the central aperture portion of the second dielectric body 53 from the rear, and the center conductor 52 is retained by the second dielectric body 53. At this time, the second dielectric body 53 is press-fitted until abutting the front-end stepped portion 23E. As a result, once the signal conductor 50 has been accommodated within the front aperture portion 23A and the intermediate aperture portion 23B, it is retained by the retaining portion 22.

The cable 4, which is a coaxial cable having a metallic center conductor 61, a dielectric body 62 made of plastic or another electrically insulating material that covers and retains the outer peripheral surface of the center conductor 61, an outer conductor 63, i.e., a metallic braid shield that covers and retains the outer peripheral surface of the dielectric body 62, and a jacket 64 made of plastic or another electrically insulating material that covers and retains the outer peripheral surface of the outer conductor 63, has the front end portion thereof inserted into the rear aperture portion 23C of the first clamping piece 20 from the front. As shown in FIG. 4, in the front end portion of the cable 4, portions of the dielectric body 62, outer conductor 63, and jacket 64 are cut away such that the outer conductor 63 is exposed at the front end of the jacket 64, the dielectric body 62 is exposed at the front end of the outer conductor 63, and the center conductor 61 is exposed at the front end of the dielectric body 62. Here, the exposed section of the center conductor 61 constitutes a contact portion 61A for contacting the center conductor 52 of the signal conductor 50.

A metallic fastening fitting 65 serving as an attachment member, a heat-shrink tube 66 made of plastic (for example, electron beam-crosslinked soft flame retardant polyolefin resin), and a metallic cord tube 67 are provided sleeved onto the front end portion of the cable 4. The fastening fitting 65, which is a tubular member extending in the forward-backward direction, is provided spanning the boundary between the exposed section of the outer conductor 63 and the front end of the jacket 64 in the forward-backward direction. The front end of the fastening fitting 65 is located slightly to the rear of the front end of the outer conductor 63. A thread ridge (not shown) is formed on the outer peripheral surface of the front end portion of the fastening fitting 65, and the fastening fitting 65 and, in turn, the cable 4, is adapted to be attached to the first clamping piece 20 by threadedly mating this thread ridge with the thread groove in the rear aperture portion 23C of the first clamping piece 20. The heat-shrink tube 66, which is a tubular member extending in the forward-backward direction that is provided spanning the boundary between the rear end of the fastening fitting 65 and jacket 64 in the forward-backward direction, retains the fastening fitting 65 and the jacket 64 in place by tightly adhering to the outer peripheral surfaces of both the fastening fitting 65 and the jacket 64.

The cord tube 67, which is a tubular member extending in the forward-backward direction, is sleeved onto the exposed section of the outer conductor 63 and, at the same time, is provided on the inside of the front portion of the fastening fitting 65. The cord tube 67, which is solder-connected to the outer peripheral surface of the outer conductor 63, is electrically communicable with the outer conductor 63. A radially outwardly protruding ledge portion 67A is formed in the front end portion of the cord tube 67. Since the fastening fitting 65 is threadedly mated with the rear aperture portion 23C of the first clamping piece 20, the ledge portion 67A is pressed against the rear stepped portion 23E of the first clamping piece 20 from the front by said fastening fitting 65. As a result, the outer conductor 63 of the cable 4 is brought into a state electrically communicable with the first clamping piece 20 through the medium of the cord tube 67.

As shown in FIG. 4, upon completion of attachment of the fastening fitting 65 and, in turn, the cable 4 to the first clamping piece 20, the contact portion 61A of the center conductor 61 of the cable 4 enters the intermediate aperture portion 23B of the first clamping piece 20 from the front and comes into contact with the multiple rear contact portions 52B of the center conductor 52 under contact pressure, which creates an electrically communicable state.

As shown in FIG. 1, a connector for connecting measuring equipment 3 is attached to the rear end portion of the cable 4. The connector for connecting measuring equipment 3 is a coaxial electrical connector having an outer conductor, a dielectric body accommodated and retained by the outer conductor, and a center conductor retained by the dielectric body. Since the connector for connecting measuring equipment 3 has a similar configuration to commonly used coaxial electrical connectors, a detailed description of its configuration will be omitted herein.

Figure 5:
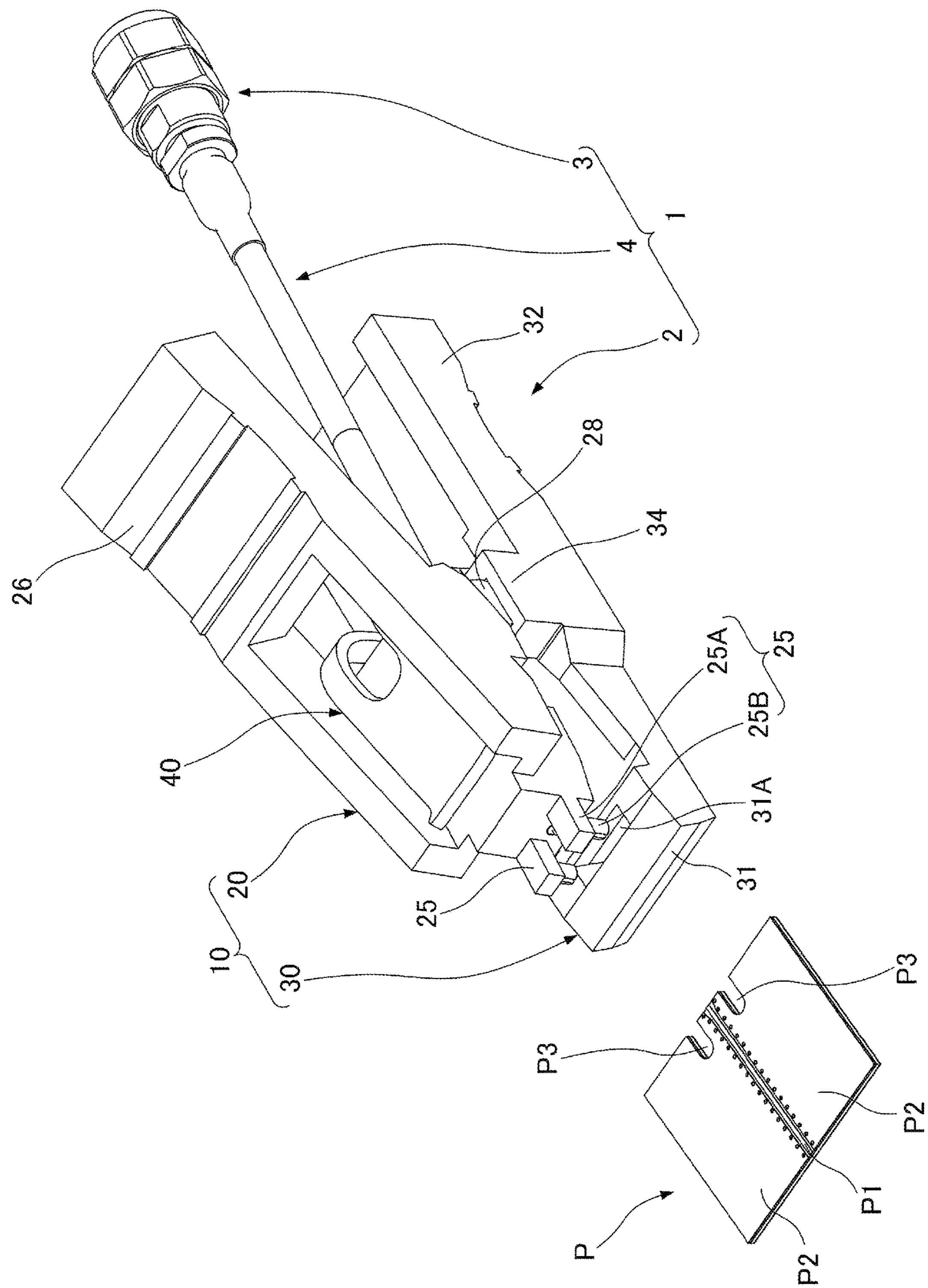
FIG. 5 is a perspective view illustrating the probe device of FIG. 1 along with a circuit board, showing a state immediately before attachment to the circuit board.

The procedure of use of the probe device 1 will be described hereinbelow. First, the connector for connecting measuring equipment 3 attached to the rear end portion of the cable 4 is connected to a counterpart connector (not shown) provided as part of the measuring equipment (not shown). Next, the board clamping body 10 is brought into an open state by applying an operating force opposing the biasing force of the biasing member 40 to the operative portions of the probe 2 attached to the front end portion of the cable 4, i.e., the first operative portion 26 of the first clamping piece 20 and the second operative portion 32 of the second clamping piece 30 (if necessary, referred to collectively as "operative portions 26, 32" below). Specifically, one grips the operative portions 26, 32 with one's fingers and pushes to counteract the biasing force of the biasing member 40. As a result, the first operative portion 26 is displaced toward the second operative portion 32, and the first clamping piece 20 is displaced in a lever-like manner, with the supported portions 28 used as a fulcrum. As shown in FIG. 5, when the first clamping piece 20 is displaced in this manner, the first clamping portions 25 of the first clamping piece 20 are displaced upward so as to be spaced from the second clamping portion 31 of the second clamping piece 30, and the board clamping body 10 is brought into an open state. In such an open state, a space larger than the through-thickness dimensions of the circuit board P is formed in the vertical direction between the bottom ends of the protrusions 25B of the first clamping portions 25 and the receiving portion 31A of the second clamping portion 31.

Next, while maintaining the board clamping body 10 in an open state, the probe 2 is disposed such that the rear end portion of the circuit board P (the end on the X2 side) is located between the first clamping portions 25 and the second clamping portion 31. Here, the first clamping portions 25 are located upwardly with respect to the circuit board P and the second clamping portion 31 is located downwardly with respect to the circuit board P. In addition, at this time, the protrusions 25B of the first clamping portions 25 are located directly above the notched portions P3 of the circuit board P.

Figure 6:
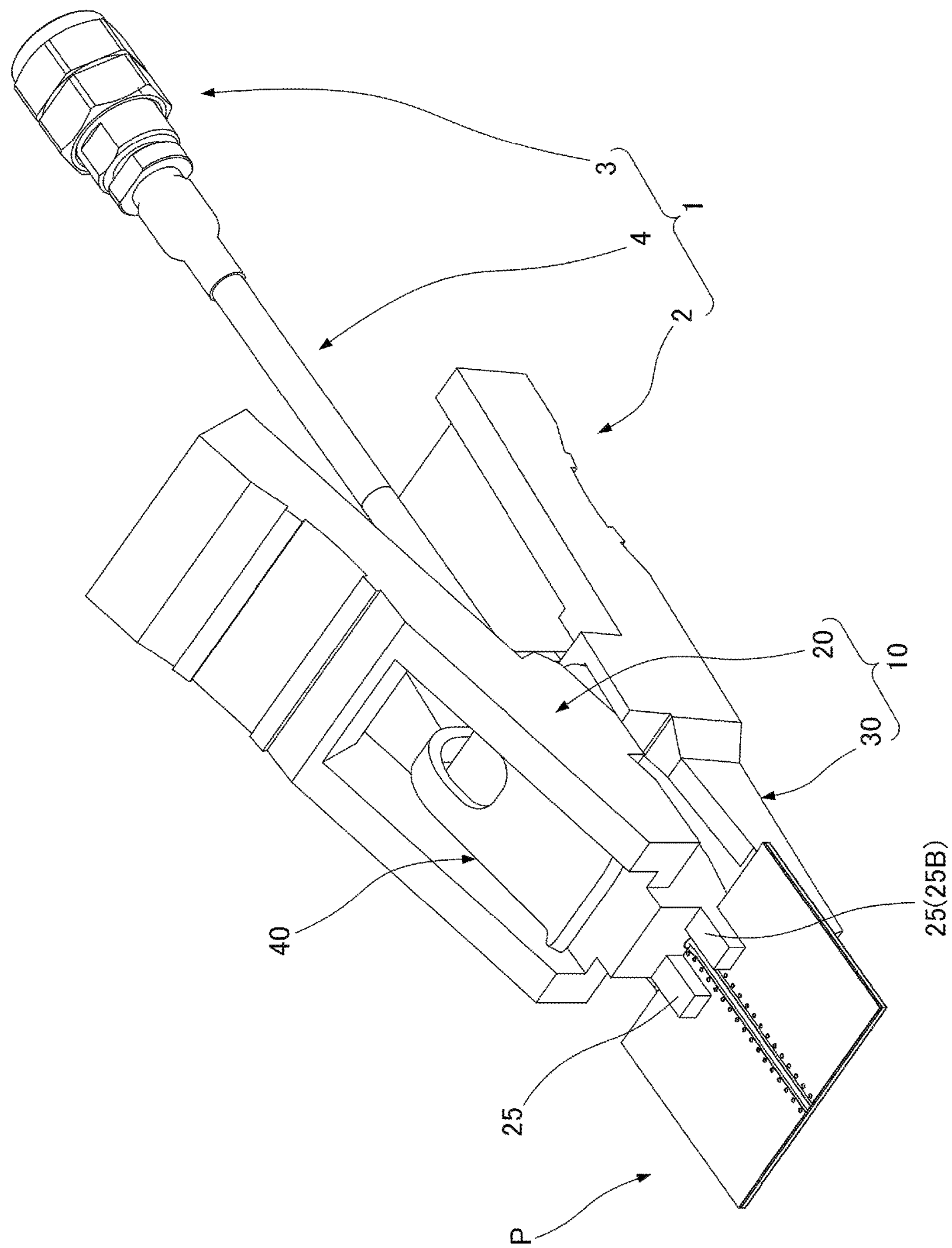
FIG. 6 is a perspective view illustrating the probe device of FIG. 1 along with a circuit board, showing a state after attachment to the circuit board.

Next, the rear end portion of the circuit board P is clamped as shown in FIG. 4 and FIG. 6 by removing the above-mentioned operating force and allowing the first clamping portions 25 and the second clamping portion 31 to be brought into closer proximity by the biasing force of the biasing member 40. As a result, the front contact portion 52A of the center conductor 52 is brought into contact with the signal pattern P1 of the circuit board P from above, thereby forming an electrically communicable state. In addition, the forward tongues 25A of the first clamping portions 25 are brought into contact (surface contact) with the ground pattern P2 of the circuit board P from above, thereby forming an electrically communicable state.

In addition, when the rear end portion of the circuit board P is clamped by the first clamping portions 25 and second clamping portion 31, the protrusions 25B of the first clamping portions 25 are inserted into the notched portions P3 of the circuit board P from above and, furthermore, the bottom end portions of the protrusions 25B protruding downwardly through the notched portions P3 enter the receiving portion 31A of the second clamping portion 31 from above (see FIG. 4). Therefore, the protrusions 25B are located within the notched portions P3 and within the receiving portion 31A. Further, since the movement of the protrusions 25B in directions parallel to the circuit board P, or more specifically, in the forward (X1 direction) and probe width directions (Y1 direction and Y2 direction) is restricted by the edge portions of the notched portions P3, the position of the probe 2 with respect to the circuit board P is fixed, and the state of contact between the front contact portion 52A and signal pattern P1, as well as the state of contact between the forward tongues 25A and ground pattern P2, is properly maintained.

As discussed previously, the outside diameter of the protrusions 25B is slightly larger than the width dimensions of the notched portions P3. In addition, in the present embodiment, the two projecting pieces that form the protrusions 25B are adapted to be slightly resiliently deformable in the probe width direction. Therefore, as they are pressed against the inner edges of the notched portions P3 extending in the forward-backward direction, the two projecting pieces of the protrusions 25B are resiliently deformed toward each other in the probe width direction and enter the notched portions P3 in this condition. Since at this time the two projecting pieces and the above-mentioned inner edges of the notched portions P3 are in contact under contact pressure, the position of the protrusions 25B and, in turn, the probe 2, with respect to the circuit board P is properly fixed. It should be noted that while in the present embodiment the protrusions 25B are split into two projecting pieces, they may also be split into three or more projecting pieces. In addition, the protrusions 25B may be formed in an unsplit columnar (for example, circular columnar) configuration, in which case the dimensions of the protrusions in the probe width direction are set smaller than the width dimensions of the notched portions P3 of the circuit board P.

Although in the above-described procedure of use, the protrusions 25B of the first clamping portions 25 are positioned directly above the notched portions P3 of the circuit board P and then inserted into said notched portions P3 from above, inserting the protrusions 25B into the notched portions P3 directly from above is not essential. In the present embodiment, the notched portions P3 serving as pass-through spaces in the circuit board P are open toward the rear. Therefore, when the probe 2 is attached to and detached from the circuit board P, the protrusions 25B can be inserted and removed through the rear end openings of the notched portions P3 of the circuit board P. Therefore, the probe 2 can be attached and detached without causing the protrusions 25B to interfere with the circuit board P even by moving the probe 2 in an oblique direction inclined with respect to the vertical direction, thereby simplifying the operations of attachment and detachment.

In the present embodiment, the first clamping piece 20, which is made of metal, makes contact with the cord tube 67 connected to the outer conductor 63 via the rear stepped portion 23E as well as with the ground pattern P2 of the circuit board P via the forward tongues 25A. Therefore, when there is a flow of signal current through the center conductor 61, center conductor 52, and signal pattern P1 as the transmission path, a return current can be directed to flow via the ground pattern P2, first clamping piece 20, cord tube 67, and outer conductor 63 as the transmission path.

Although in the present embodiment the first clamping piece 20 is made of metal in its entirety, only part of it may be made of metal as long as the above-described return current is allowed to flow. In such a case, for example, only the retaining portion 22 and the first clamping portions 25 in the first clamping piece 20 may be made of metal, while other sections may be formed of materials other than metal (for example, plastic or another electrically insulating material). In addition, although in the present embodiment, in addition to the first clamping piece 20, the second clamping piece 30 and biasing member 40 are also made of metal, it is not essential for the second clamping piece 30 and biasing member 40 to be made of metal. For example, the second clamping piece 30 and biasing member 40 may be made of plastic or another electrically insulating material.

Further, when the probe 2 is disengaged from the circuit board P, it is sufficient to unclamp the rear end portion of the circuit board P by spreading the first clamping portions 25 and second clamping portion 31 widely apart by applying the above-mentioned operating force to the operative portions 26, 32 of the probe 2. Thus, in the present embodiment, testing of electronic components mounted on the circuit board P can be performed in an efficient manner because the probe 2 can be easily attached to and detached from the circuit board P by simply applying or removing an operating force to or from the operative portions 26, 32 of the probe 2.

Second Embodiment

In the first embodiment, while the signal conductor 50 retained by the first clamping piece 20 was configured to achieve the functionality of the coaxial electrical connector in co-operation with the metallic first clamping piece 20, in the second embodiment, the difference from the first embodiment is that the signal conductor is made up of a circuit board and a coaxial electrical connector mounted on said circuit board. The probe device according to the present embodiment is the same as in the first embodiment with the exception of the manner in which the signal conductor is configured, the manner in which the signal conductor is retained, and the manner in which said signal conductor and the cable are connected. The discussion herein will focus on differences from the first embodiment, and descriptions of components identical to the first embodiment will be omitted.

Figure 7:
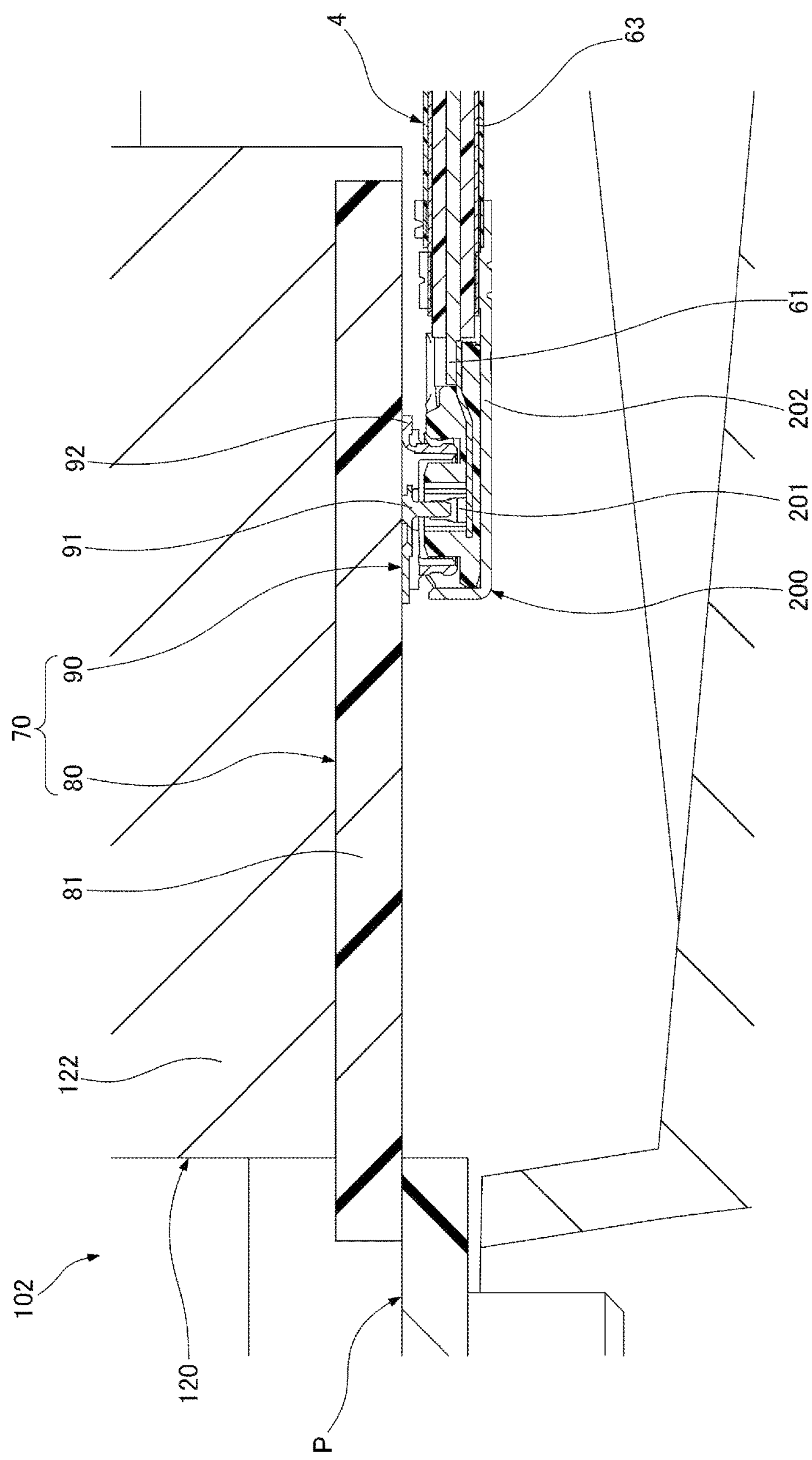
FIG. 7 is a cross-sectional view illustrating an enlarged portion of the probe device of the second embodiment of the present invention, showing a longitudinal cross-section taken at the middle point in the probe width direction.

FIG. 7, which is a cross-sectional view illustrating an enlarged portion of the probe device of the second embodiment, shows a longitudinal cross-section taken at the middle point in the probe width direction. In the probe 102 of the present embodiment, the signal conductor 70 has a circuit board 80, which is retained by the bottom face of a retaining portion 122 forming part of a first clamping piece 120, and a coaxial electrical connector 90 (referred to as "board-side coaxial connector 90" hereinbelow), which is mounted on the bottom face of the circuit board 80. The circuit board 80 has a plate-shaped substrate 81, which is made of plastic or another electrically insulating material, and a metallic signal transmission path (not shown) along with a metallic ground transmission path (not shown), which are provided along the bottom face of the substrate 81. In the present embodiment, the signal transmission path is formed as a signal pattern extending in the forward-backward direction, and the ground transmission path is formed as a ground pattern extending along the signal transmission path on the opposite sides of the signal transmission path in the probe width direction. As shown in FIG. 7, the front end portion of the circuit board 80 protrudes forwardly of the retaining portion 122.

In addition, the board-side coaxial connector 90 is a male-type coaxial electrical connector that is mounted via solder connection to the bottom face of the circuit board 80 and has the hereinafter-described cable-side coaxial connector 200 connected thereto from below. The board-side coaxial connector 90 has a center conductor 91 and an outer conductor 92, with the center conductor 91 connected to the signal transmission path of the circuit board 80, and the outer conductor 92 connected to the ground transmission path of the circuit board 80.

A female-type coaxial electrical connector 200 (referred to as "cable-side coaxial connector 200" hereinbelow), which is matingly connectable to the board-side coaxial connector 90, is provided in the front end portion of the cable 4. The cable-side coaxial connector 200 is a so-called right angle-type coaxial electrical connector, in which the direction of connector connection is the vertical direction perpendicular to the forward-backward direction, i.e., the longitudinal direction of the cable 4. The cable-side coaxial connector 200 has a center conductor 201 and an outer conductor 202, with the center conductor 201 connected to the center conductor 61 of the cable 4, and the outer conductor 202 connected to the outer conductor 63 of the cable 4.

As shown in FIG. 7, the cable-side coaxial connector 200 is matingly connected to the board-side coaxial connector 90 from below. At this time, the cable-side coaxial connector 200 has its center conductor 201 connected to the center conductor 91 of the board-side coaxial connector 90 and its outer conductor 202 connected to the outer conductor 92 of the board-side coaxial connector 90.

Since the board-side coaxial connector 90 and cable-side coaxial connector 200 have a similar configuration to common coaxial electrical connectors, a detailed description of their configuration will be omitted herein. It should be noted that although in the present embodiment the board-side coaxial connector 90 is a male-type connector and the cable-side coaxial connector 200 is a female-type connector, as an alternative, the board-side coaxial connector 90 may be a female-type connector and the cable-side coaxial connector 200 may be a male-type connector.

As shown in FIG. 7, in the present embodiment, upon attachment of the probe 2 to the circuit board P, the front end portion of the circuit board 80 is adapted to be brought into contact with the circuit board P from above. At this time, the front end portion of the signal transmission path of the circuit board 80 makes contact with the signal pattern P1 of the circuit board P from above (see FIG. 1), and the front end portion of the ground transmission path of the signal conductor 70 makes contact with the ground pattern P2 of the circuit board P from above (see FIG. 1). Therefore, when there is a flow of signal current through the center conductor 61, center conductor 201, center conductor 91, signal transmission path, and signal pattern P1 as the transmission path, a return current can be directed to flow via the ground pattern P2, ground transmission path, outer conductor 92, outer conductor 202, and outer conductor 63 as the transmission path.

Third Embodiment

In the first embodiment, while the cable 4 was adapted to be connected to the signal conductor 50 because the fastening fitting 65 provided in the front end portion of the cable 4 was threadedly mated with the rear aperture portion 23C of the first clamping piece 20, in the third embodiment, the difference from the first embodiment is that the cable is adapted to be connected to the signal conductor because the coaxial connector provided in the front end portion of the cable is mated with the rear aperture portion of the first clamping piece. The probe device according to the present embodiment is the same as in the first embodiment with the exception of the manner in which the accommodating aperture portion of the first clamping piece is configured, the manner in which the signal conductor is configured, and the manner in which said signal conductor and the cable are connected. The discussion herein will focus on differences from the first embodiment, and descriptions of components identical to the first embodiment will be omitted upon assigning thereto the same reference numerals as the ones used for the respective components in the first embodiment.

Figure 8:
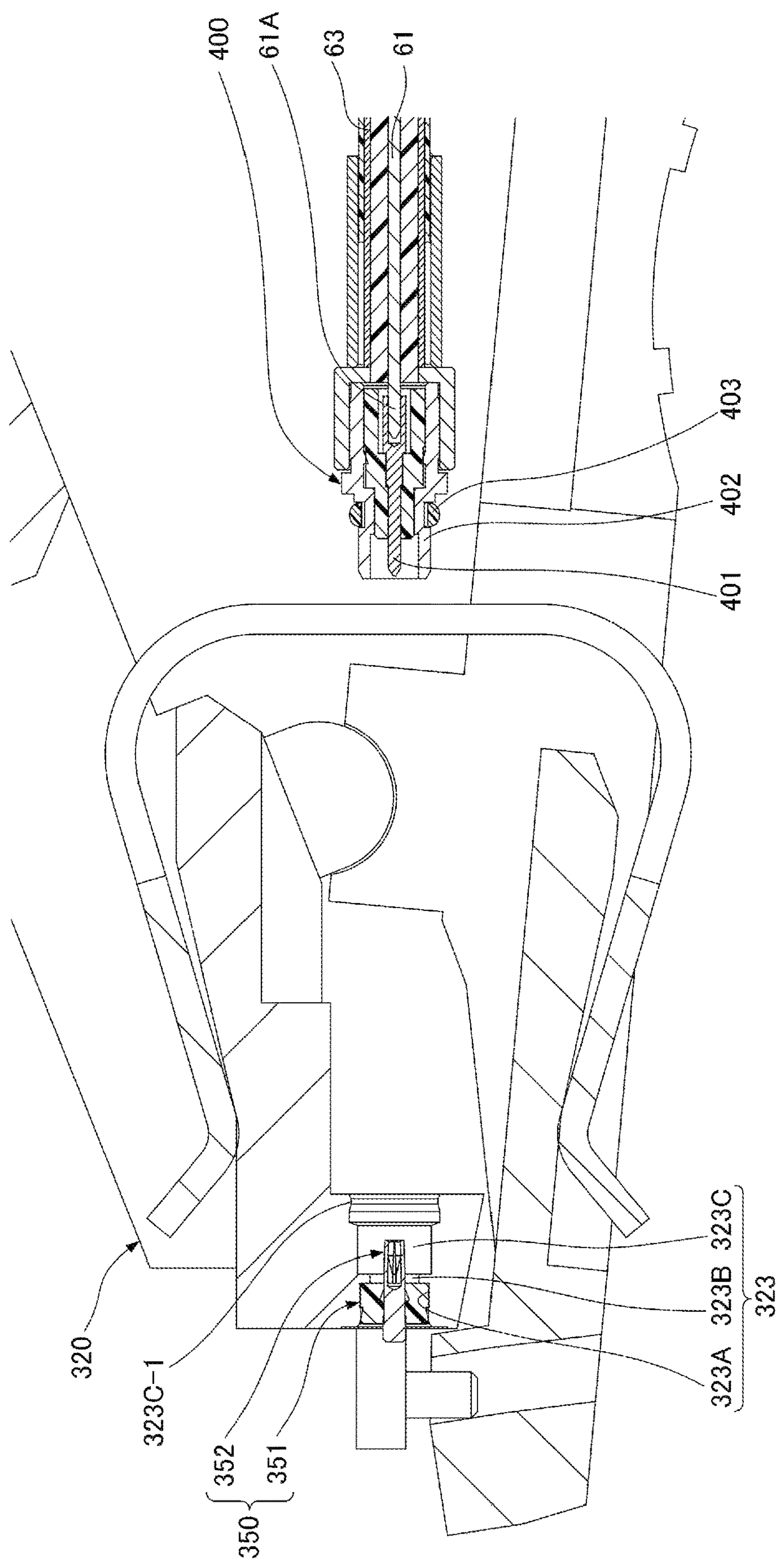
FIG. 8 is a cross-sectional view illustrating an enlarged portion of the probe device of the third embodiment of the present invention, showing a longitudinal cross-section taken at the middle point in the probe width direction immediately before the probe and the cable are connected.
Figure 9:
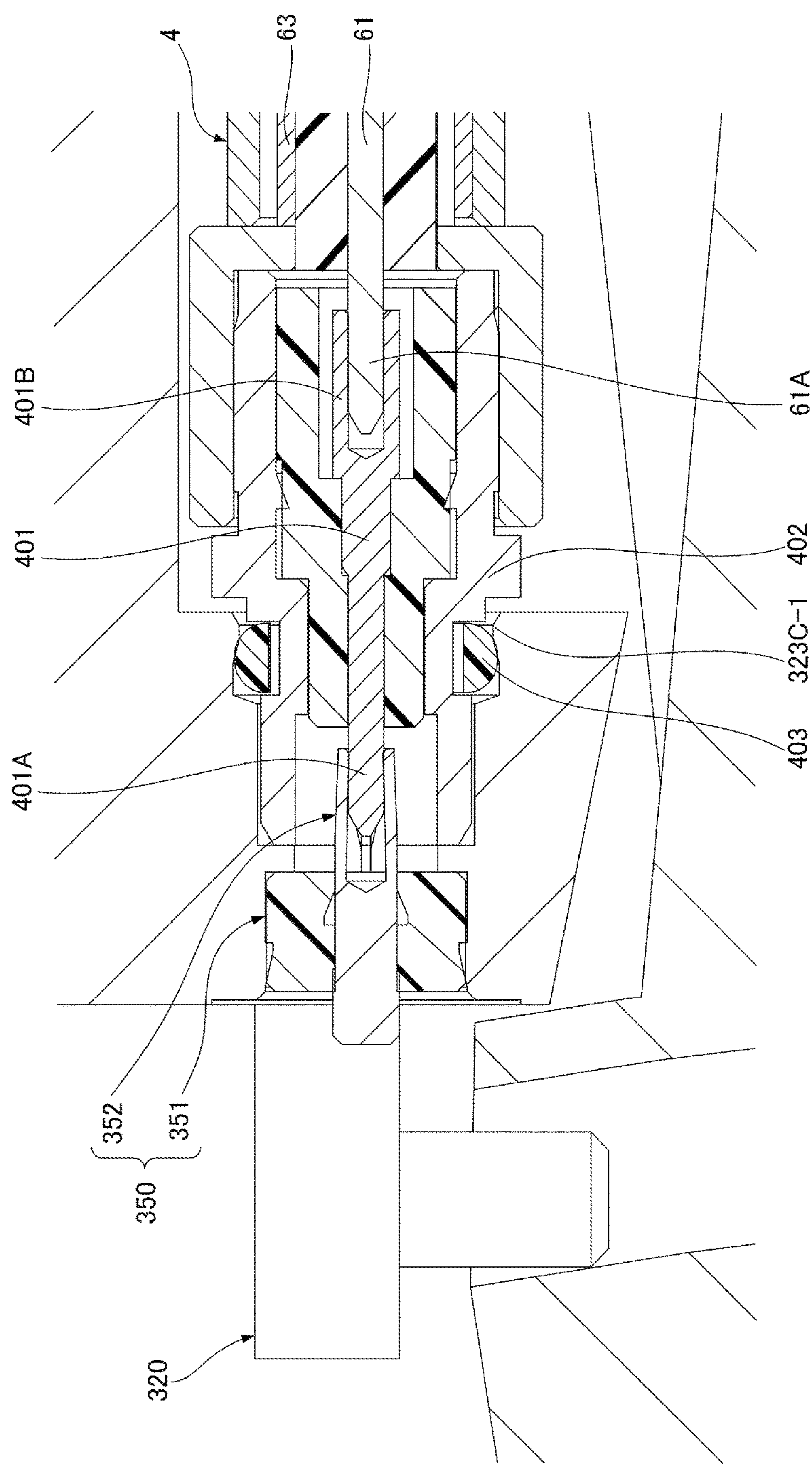
FIG. 9 is a cross-sectional view illustrating an enlarged portion of the probe device of the third embodiment of the present invention, showing a longitudinal cross-section taken at the middle point in the probe width direction when the probe and the cable are connected.

FIG. 8 and FIG. 9 are cross-sectional views illustrating enlarged portions of the probe device of the third embodiment, showing longitudinal cross-sections taken at the middle point in the probe width direction. Here, FIG. 8 illustrates a state immediately before the probe 302 and cable 4 are connected, and FIG. 9 illustrates a state when the probe 302 and cable 4 are connected.

In the present embodiment, as shown in FIG. 8, a front aperture portion 323A, an intermediate aperture portion 323B, and a rear aperture portion 323C are formed in successive mutual communication starting from the front in the accommodating aperture portion 323 of the retaining portion 322 of the first clamping piece 320, with their inside diameters progressively decreasing in the order of the rear aperture portion 323C, front aperture portion 323A, and intermediate aperture portion 323B. A cylindrical dielectric body 351 forming part of a signal conductor 350 is press-fitted and retained in the front aperture portion 323A. The rear portion of the rear aperture portion 323C has a slightly larger inside diameter than its other parts. The inner peripheral surface of said rear portion on the rear end side protrudes slightly radially inward, with this protruding section constituting an engaging portion 323C-1 that is lockingly engageable with a ring member 403 provided in the hereinafter-described cable-side coaxial connector 400. A center conductor 352 forming part of the signal conductor 350 is press-fitted and retained in the dielectric body 351.

A cable-side coaxial connector 400 serving as a connector for probe connection is provided in the front end portion of the cable 4. The cable-side coaxial connector 400 has a center conductor 401 and an outer conductor 402, with the center conductor 401 connected to the center conductor 61 of the cable 4, and the outer conductor 402 connected to the outer conductor 63 of the cable 4. As shown in FIG. 9, in the center conductor 401, a pin-shaped male-type contact portion 401A is formed in the front end portion, and a female-type contact portion 401B having multiple resilient pieces is formed in the rear end portion. The female-type contact portion 401B is in contact with a contact portion 61A forming part of the center conductor 61 of the cable 4. In addition, a ring member 403 made of plastic or another electrically insulating material is attached to the outer peripheral surface of the front portion of the outer conductor 402.

When the cable 4 is connected to the first clamping piece 320, the cable-side coaxial connector 400 is inserted into and matingly connected to the rear aperture portion 323C of the first clamping piece 320 from the rear. At this time, as shown in FIG. 9, the ring member 403 of the cable-side coaxial connector 400 lockingly engages the engaging portion 323C-1 of the rear aperture portion 323C in the forward-backward direction, thereby preventing inadvertent rearward decoupling of the cable-side coaxial connector 400. Once the cable-side coaxial connector 400 has been matingly connected, the center conductor 401 is brought into contact with the center conductor 352 of the signal conductor 350, and the outer conductor 402 is brought into contact with the interior surface of the rear aperture portion 323C.

When disengaging the cable 4 from the first clamping piece 320, it is sufficient to grip the cable-side coaxial connector 400 with one's fingers and rearwardly pull the cable-side coaxial connector 400 using a disengaging force greater than the force of engagement between the ring member 403 and the engaging portion 323C-1. As a result, the cable-side coaxial connector 400 is easily removed from the rear aperture portion 323C. Thus, in the present embodiment, the attachment and detachment of the cable 4 to and from the first clamping piece 320 can be readily accomplished by simply inserting and removing the cable-side coaxial connector 400 into and from the rear aperture portion 323C.

Figure 10:
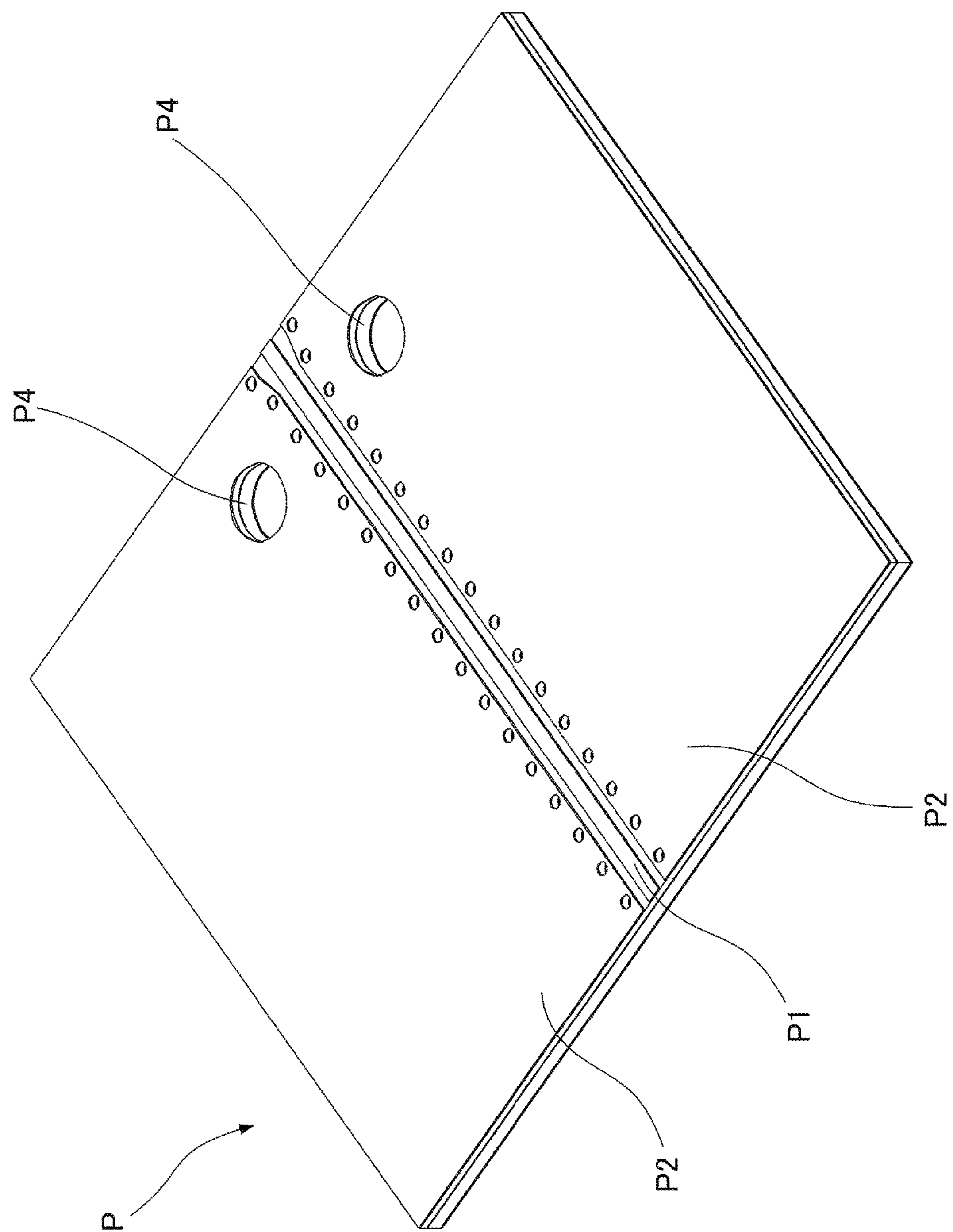
FIG. 10 is a perspective view illustrating a circuit board according to a variation of the present invention.

Although in Embodiments 1 through 3 the pass-through spaces of the circuit board P are formed as notched portions P3, the shape of the pass-through spaces is not limited thereto and, for example, as shown in a variation illustrated in FIG. 10, the pass-through spaces may be formed as round aperture portions P4 disposed through the circuit board P in the vertical direction. The inside diameter of the aperture portions P4 is set larger than the outside diameter of the protrusions of the first clamping portion. If the pass-through spaces are formed as aperture portions in this manner, then when the probe is attached to the circuit board P, the protrusions of the first clamping portion of the board clamping body maintained in an open state are positioned directly above the aperture portions P4 of the circuit board P and then inserted into said aperture portions P4 from above. It should be noted that the shape of the aperture portions does not necessarily have to be circular and, for example, may be a quadrangular shape.

Although in Embodiments 1 through 3 the probe device is used for performance testing of circuit board-mounted electronic components such as IC chips, as an alternative, it is possible, for instance, to use it for performance testing of circuit boards themselves, without any electronic components mounted thereon.

DESCRIPTION OF THE REFERENCE NUMERALS

1 Probe device
2 Probe
3 Connector for connecting measuring equipment
4 Cable
10 Board clamping body
20 First clamping piece
25 First clamping portion
25B Protrusion
26 First operative portion
30 Second clamping piece
31 Second clamping portion
31A Receiving portion
32 Second operative portion
40 Biasing member
50 Signal conductor
51 Dielectric body
52 Center conductor
65 Fastening fitting (attachment member)
70 Signal conductor
80 Circuit board
81 Substrate
102 Probe
120 First clamping piece
302 Probe
320 First clamping piece
350 Signal conductor
351 Dielectric body
352 Center conductor
P Circuit board
P1 Signal pattern (signal circuitry)
P2 Ground pattern (ground circuitry)
P3 Notched portions (pass-through spaces)
P4 Aperture portions (pass-through spaces)

The invention claimed is:

1. A probe for a probe device that interconnects a measuring equipment and a circuit board via a cable, the probe device being attached to a measurement target end of the cable and being connected to the circuit board, said probe having:

a signal conductor electrically communicable with signal circuitry formed on a top surface of the circuit board, a board clamping body capable of clamping the circuit board in its through-thickness direction between a top surface and a bottom surface, and a biasing member maintaining the board clamping body in a state of clamping the circuit board, wherein:

the board clamping body has a first clamping piece located above the top surface of the circuit board and retaining the signal conductor, and a second clamping piece located below the bottom surface of the circuit board, the biasing member is provided spanning between the first clamping piece and the second clamping piece in a resiliently deformable manner and biases the first clamping piece and the second clamping piece toward a position clamping the circuit board, the first clamping piece has first clamping portions at one end located adjacent to the circuit board that are placed in contact with the top surface of the circuit board, and the second clamping piece has a second clamping portion at one end located adjacent to the circuit board that is placed in contact the bottom surface of the circuit board, and at least one of the first clamping piece and second clamping piece has an operative portion at an other end located on the side distal from the circuit board for receiving an operating force that opposes a biasing force exerted by the biasing member.

2. The probe according to claim 1, wherein the first clamping portions r the second clamping portion has protrusions inserted into pass-through spaces formed through the circuit board in the through-thickness direction, and wherein the first clamping portions or the second clamping portion that does not have protrusions, has a receiving portion for receiving distal end portions of the protrusions protruding out through the pass-through spaces.

3. The probe according to claim 2, wherein the protrusions are insertable into pass-through spaces formed as cutouts in an edge of the circuit board.

4. The probe according to claim 1, wherein the signal conductor has a dielectric body retained by the first clamping piece, and a center conductor retained by the dielectric body and enabled to make contact with signal circuitry on the circuit board.

5. The probe according to claim 4, wherein the first clamping piece, which is made of metal and electrically communicable with an outer conductor in the cable, is enabled to make contact with ground circuitry formed on the surface of the one side of the circuit board.

6. The probe according to claim 4, wherein the first clamping piece is connectable to the end of the cable by attaching thereto an attachment member provided at the end of the cable.

7. The probe according to claim 4, wherein the first clamping piece is connectable to the end of the cable by mating therewith a connector for probe connection provided at the end of the cable.

8. The probe according to claim 1, wherein the signal conductor has a plate-shaped substrate made of an electrically insulating material, and a metallic signal transmission path provided on the substrate along a major face of the substrate and enabled to make contact with the signal circuitry on the circuit board.

9. The probe according to claim 8, wherein the signal conductor has a metallic ground transmission path provided on the substrate along a major face of the substrate, and the ground transmission path is enabled to make contact with ground circuitry formed on the surface of the one side of the circuit board.

10. A probe device having the probe according to claim 1, a connector for connecting measuring equipment connected to a counterpart connector provided as part of the measuring equipment, and a cable interconnecting the probe and the connector for connecting the measuring equipment.

* * * * *